(12) United States Patent
Okajima et al.

(10) Patent No.: US 6,382,381 B1
(45) Date of Patent: May 7, 2002

(54) BICYCLE HUB ASSEMBLY

(75) Inventors: Shinpei Okajima, Izumi; Tsutomu Muraoka, Sakai, both of (JP)

(73) Assignee: Shimano Inc., Sakai (JP)

( * ) Notice: Subject to any disclaimer, the term of this patent is extended or adjusted under 35 U.S.C. 154(b) by 29 days.

(21) Appl. No.: 09/656,376

(22) Filed: Sep. 6, 2000

(51) Int. Cl.[7] .......................... F16D 41/30; B60B 27/04
(52) U.S. Cl. ...................... 192/64; 301/110.5; 474/160
(58) Field of Search .................. 192/64; 301/110.5; 474/160

(56) References Cited

U.S. PATENT DOCUMENTS

| | | | | |
|---|---|---|---|---|
| 4,567,973 A | * | 2/1986 | Butz | 192/64 |
| 4,580,670 A | | 4/1986 | Nagano | 192/64 |
| 5,194,051 A | | 3/1993 | Nagano | 474/160 |
| 5,460,254 A | * | 10/1995 | Huang | 192/64 |
| 5,738,197 A | * | 4/1998 | Kroger et al. | 192/64 |
| 5,882,088 A | | 3/1999 | Yahata | 301/110.5 |
| 5,954,604 A | | 9/1999 | Nakamura | 474/160 |

FOREIGN PATENT DOCUMENTS

JP          5-338579 A    *  12/1993

* cited by examiner

Primary Examiner—Richard M. Lorence
(74) Attorney, Agent, or Firm—Shinjyu Global IP Counselors, LLP

(57) ABSTRACT

A bicycle wheel basically has a central hub assembly, a plurality of spokes extending outwardly from the central hub assembly and an annular rim coupled to the outer ends of the spokes for supporting a tire. The central hub assembly has a hub axle, a hub unit, a freewheel and a sprocket assembly with a plurality of sprockets. The hub axle has a center axis extending between a first frame mounting end and a second frame mounting end. The hub unit has a hub body, a first spoke mounting portion, a second spoke mounting portion and an interior passageway. The first spoke mounting portion is located adjacent a first end of the hub body. The second spoke mounting portion is located adjacent a second end of the hub body. The interior passageway extends through the hub body with the hub axle being rotatably supported therein. The freewheel is operatively coupled between the first end of the hub axle and the first end of the hub body. The sprockets are coupled to the freewheel and axially spaced apart along the freewheel. The first spoke mounting portion has a recess that receives inner portions of the freewheel and the sprocket assembly therein. The first spoke mounting portion is also at least partially located in a radial center portion of one of the sprockets.

31 Claims, 9 Drawing Sheets

BICYCLE HUB ASSEMBLY

BACKGROUND OF THE INVENTION

1. Field of the Invention

This invention generally relates to a bicycle wheel having a hub axle adapted to be mounted to a bicycle frame, a hub body rotatably supported on the hub shaft, an annular rim and a plurality of spokes extending inwardly from the rim to the hub body. More specifically, the present invention relates to the hub of the bicycle wheel with a freewheel being provided axially on one side of the hub body.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of the bicycle that has been extensively redesigned over the past years is the rear bicycle hubs. Rear bicycle hubs are constantly being redesigned to be lightweight yet more durable and stronger. Moreover, rear bicycle hubs have been redesigned over the years to have more sprockets or gears. In particular, most of today's bicycles have at least seven sprockets. Moreover, some bicycles even have nine sprockets. There are demands for a simplified mounting structure and easy mounting method.

One popular form of drive train for a bicycle includes utilizing a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is provided with a freewheel that has a one-way clutch.

Freewheels are usually mounted on the rear hub of a bicycle for transmitting a driving force to the rear bicycle wheel in one rotation direction only. Freewheels are used so that the bicycle can advance freely without any rotation of the pedals. Freewheels include boss type freewheels which are mounted on the boss of the rear hub by being screwed onto the rear hub, and freehub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part, and a one-way clutch which is installed between the outer tubular part and inner tubular part for transmitting the driving force from the outer tubular part to the inner tubular part in one rotational direction only. The outer tubular part has a plurality of gears mounted thereon, while the inner tubular part is usually mounted on the rear hub of the bicycle.

Splines are formed between the sprockets and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

As the number of rear gears or sprockets have increased over the years, the freewheel has become larger and heavier. Moreover, with the increased number of gears or sprockets, a wider range of torque is being applied from the sprockets to the freewheel. In addition, the spoke mounting portions of the rear hub have gotten closer together as the number of rear gears or sprockets have increased over the years. This results in a less stable and a less rigid wheel.

In view of the above, there exists a need for an improved rear hub assembly for a bicycle wheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a rear hub assembly for a bicycle wheel that is more stable and more rigid relative to conventional rear hub assemblies with an equal number of gears or sprockets.

Another object of the present invention is to provide a rear hub assembly for a bicycle wheel that has better performance in terms of strength and durability relative to conventional rear hub assemblies.

Still another object of the present invention is to provide a rear hub assembly with a freewheel that can support several sprockets in a compact manner.

Yet another object of the present invention is to provide a freewheel that is relatively easy to assemble and relatively inexpensive to manufacture.

The foregoing objects can be attained by providing a bicycle wheel basically has a central hub assembly, a plurality of spokes extending outwardly from the central hub assembly and an annular rim coupled to the outer ends of the spokes for supporting a tire. The central hub assembly has a hub axle, a hub unit, a freewheel and a plurality of sprockets. The hub axle has a center axis extending between a first frame mounting end and a second frame mounting end. The hub unit has a hub body, a first spoke mounting portion, a second spoke mounting portion and an interior passageway. The first spoke mounting portion is located adjacent a first end of the hub body. The second spoke mounting portion is located adjacent a second end of the hub body. The interior passageway extends through the hub body with the hub axle being rotatably supported therein. The freewheel is operatively coupled between the first end of the hub axle and the first end of the hub body. The sprockets are coupled to the freewheel and axially spaced apart along the freewheel. The sprocket assembly has an inner portion recessed within a recess of the first spoke mounting portion.

These and other objects, features, aspects and advantages of the present invention will become apparent to those skilled in the art from the following detailed description, which, taken in conjunction with the annexed drawings, discloses preferred embodiment of the present invention.

BRIEF DESCRIPTION OF THE DRAWINGS

Referring now to the attached drawings which form a part this original disclosure.

DETAILED DESCRIPTION OF THE PREFERRED EMBODIMENTS

Figure 1:
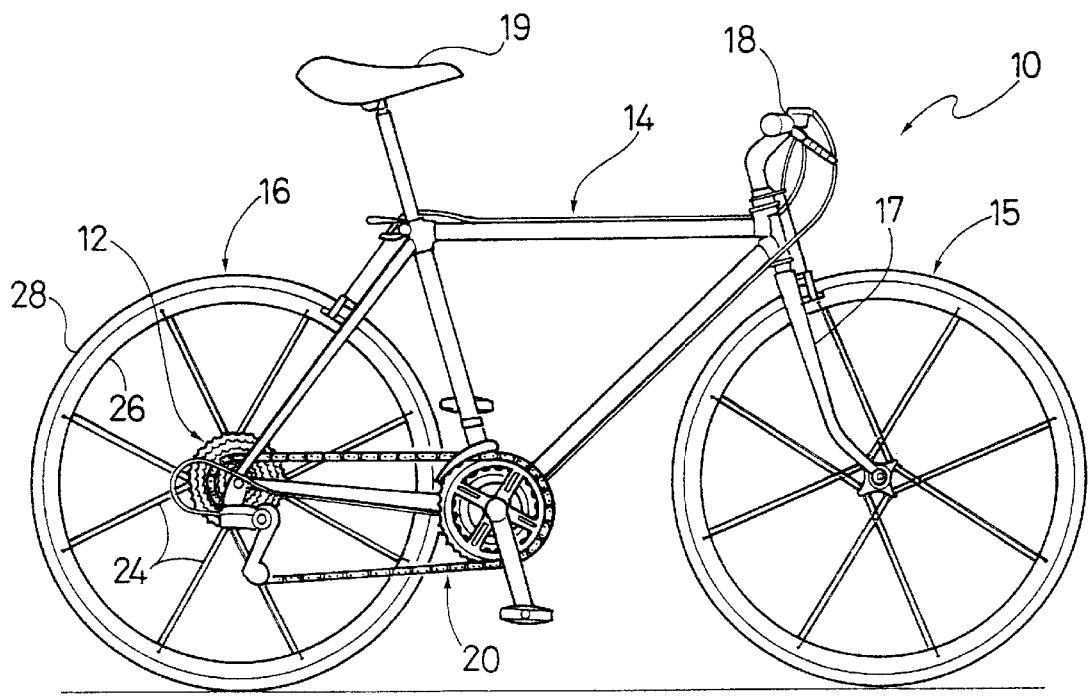
FIG. 1 is a side elevational view of a bicycle having a rear wheel with a bicycle hub assembly in accordance with the present invention.

Referring initially to FIG. 1, a bicycle 10 is illustrated with a bicycle hub assembly 12 in accordance with the present invention. The bicycle 10 basically has a frame 14 with front and rear wheels 15 and 16 rotatably coupled thereto. A front fork 17 is coupled between the frame 14 and the front wheel 15 in a conventional manner. The front wheel 15 is turned by turning a handlebar 18, which is fixedly coupled to the front fork 17. The rear wheel 16 is rotatably coupled to a rear portion of the frame 14. The frame 14 also has a seat 19 adjustably coupled to frame 14 and a drive train 20 for propelling bicycle 10.

Since the parts of the bicycle 10 are well known in the art, the parts of the bicycle 10 will not be discussed or illustrated in detail herein, except as they are modified in accordance with the present invention. Moreover, various conventional bicycle parts such as brakes, derailleurs, additional sprockets, etc., which are not illustrated and/or discussed in detail herein, can be used in conjunction with the present invention.

Figure 2:
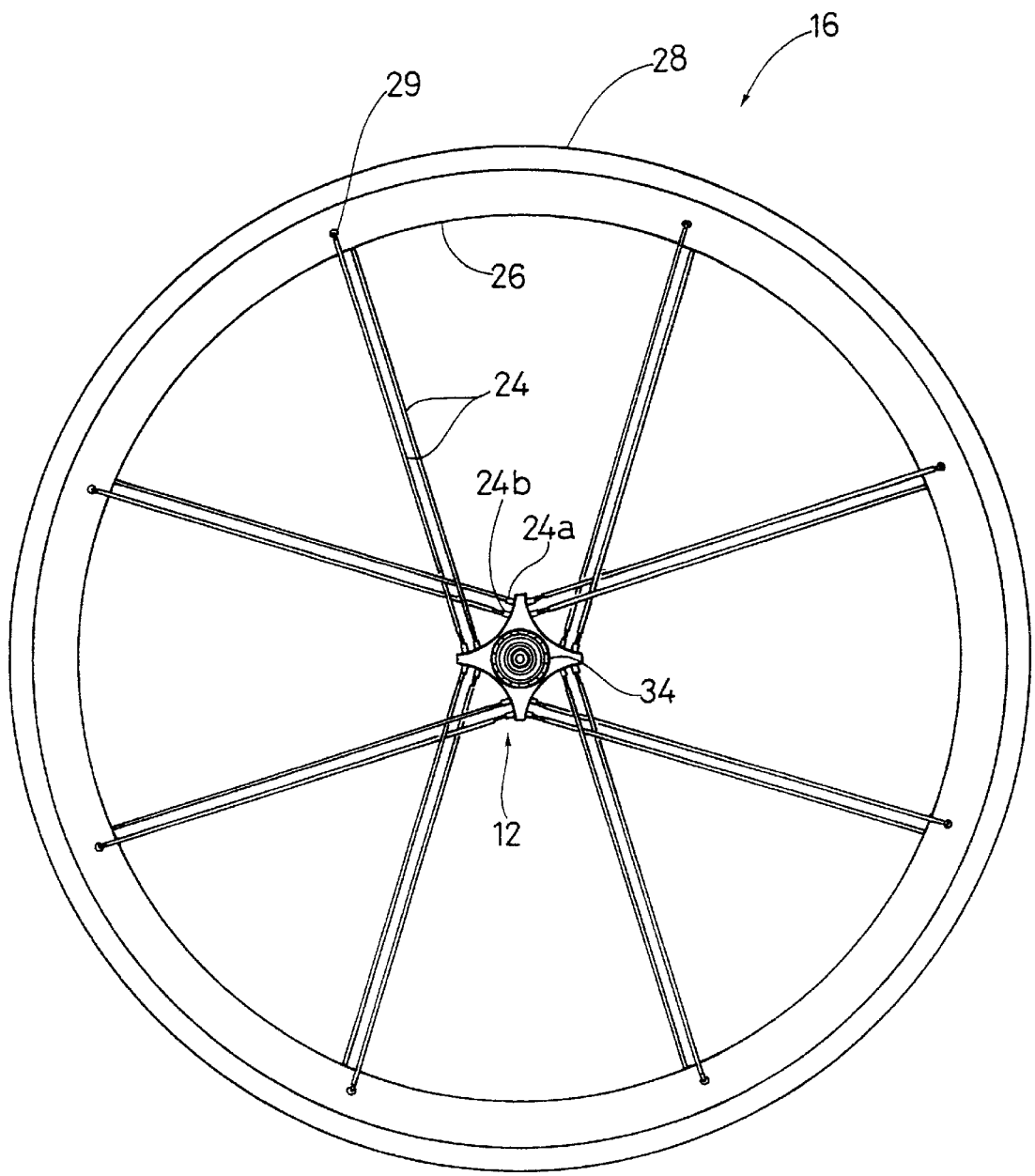
FIG. 2 is a side elevational view of the rear bicycle wheel with the bicycle hub assembly illustrated in FIG. 1 in accordance with the present invention.
Figures 3, 4:
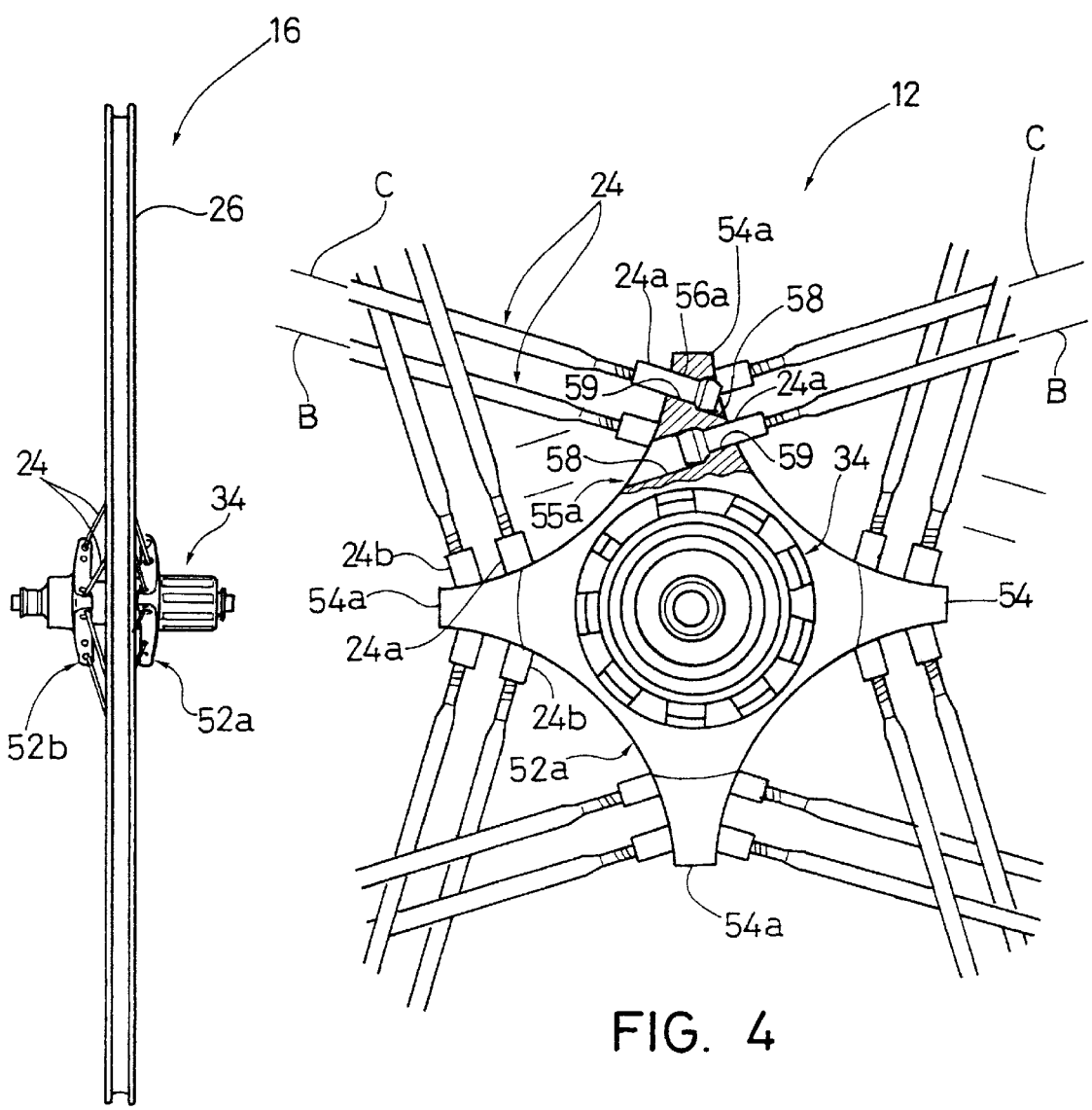
FIG. 3 is an edge elevational view of the rear bicycle wheel with the bicycle hub assembly illustrated in FIGS. 1 and 2 in accordance with the present invention.
FIG. 4 is a partial, enlarged elevational view of the bicycle hub assembly in accordance with the present invention, with a portion of the hub body broken away for purposes of illustration.

Turning now to FIGS. 2–4, the rear wheel 16 basically includes the rear bicycle hub assembly 12 of the present invention, a plurality of outwardly extending spokes 24 and an annular rim 26 with a pneumatic tire 28 coupled thereto in a conventional manner. In the illustrated embodiment, the rear wheel 16 has sixteen spokes 24 extending radially between the hub assembly 12 and the annular rim portion 26. Of course, it will be apparent to those skilled in the art from this disclosure that the rear wheel 16 can have fewer or more spokes 24 than illustrated if needed and/or desired.

The rim 26 is constructed of a substantially rigid material, such as those materials, which are well known in the art. For example, the rim 26 can be constructed of any suitable metallic material, such as plated steel, stainless steel, aluminum, magnesium or titanium, as well as other non-metallic materials, such as a carbon fiber composite, which can be utilized for a bicycle wheel. The rim 26 is relatively conventional. Therefore, rim 26 will not be discussed or illustrated in detail herein.

Each of the spokes 24 has an outer end or spoke head coupled to rim 26 by reinforcement members or washers 29 and an inner threaded end coupled to the rear bicycle hub assembly 12 by spoke nipples 24a and 24b. The reinforcement members or washers 29 are designed to disperse the stresses applied to rim 26 by spokes 24. Preferably, the inner ends of spokes 24 are adjustable coupled to the rear bicycle hub assembly 12. More specifically, the inner ends of spokes 24 are threadedly coupled to the rear bicycle hub assembly 12 by spoke nipples 24a and 24b.

Referring now to FIGS. 5–10, the bicycle hub assembly 12 basically includes a hub axle 30, a hub unit 32, a freewheel 34 and a sprocket assembly 36. The hub axle 30 rotatably supports the hub unit 32, the freewheel 34 and the sprocket assembly 36 about a center axis of rotation A by a pair of bearing assemblies 38a and 38b. The hub axle 30 has a first frame mounting end 30a and a second frame mounting end 30b with the center axis A extending therebetween.

Figure 5:
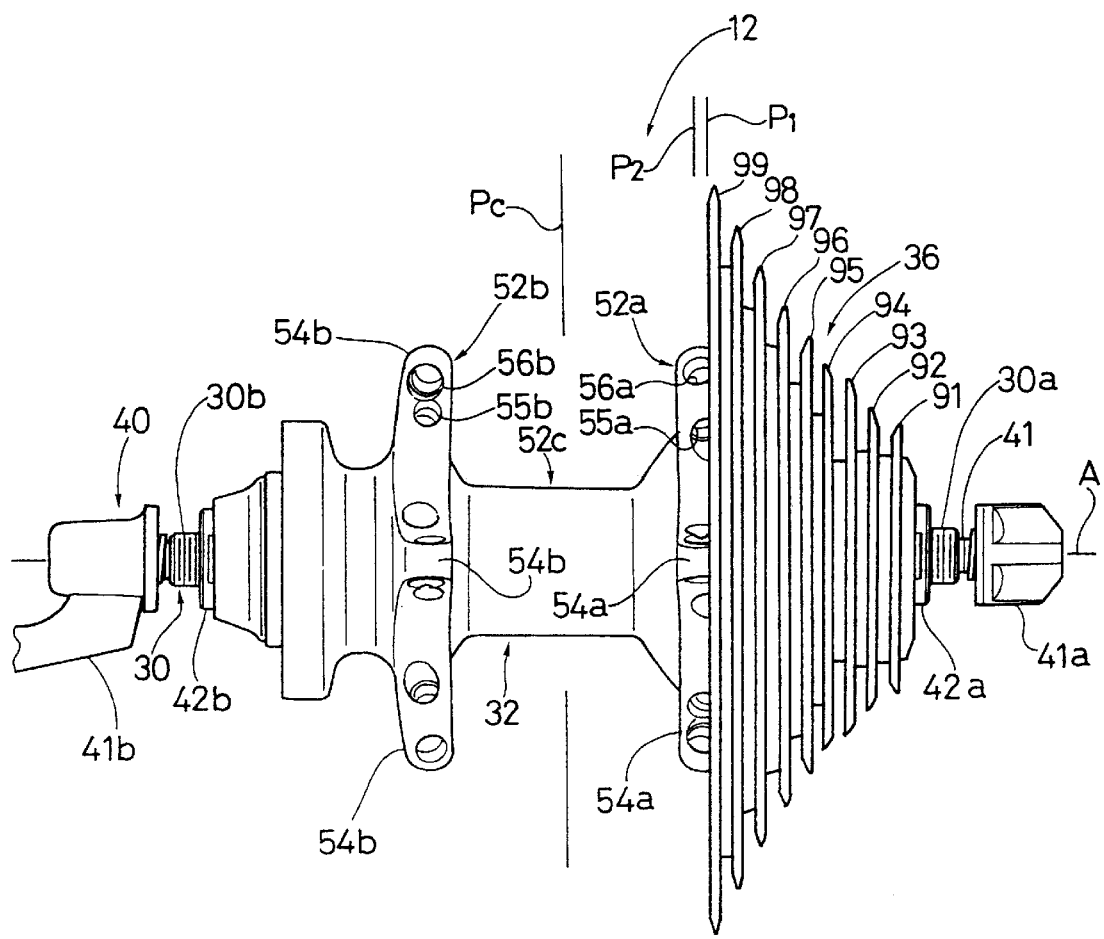
FIG. 5 is a rear elevational view of the bicycle hub assembly in accordance with the present invention.
Figure 6:
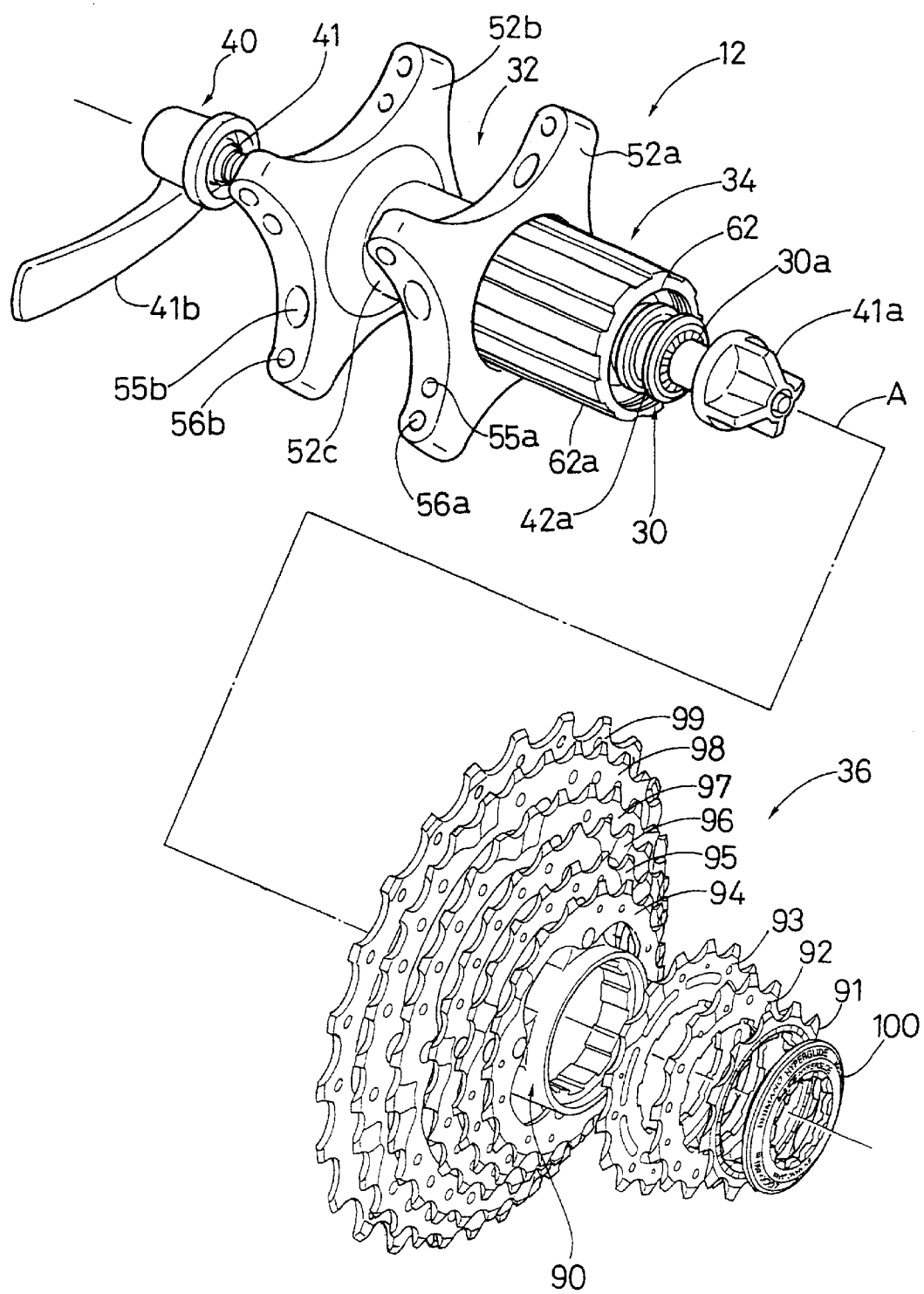
FIG. 6 is a partial exploded perspective view of the bicycle hub assembly in accordance with the present invention.
Figure 7:
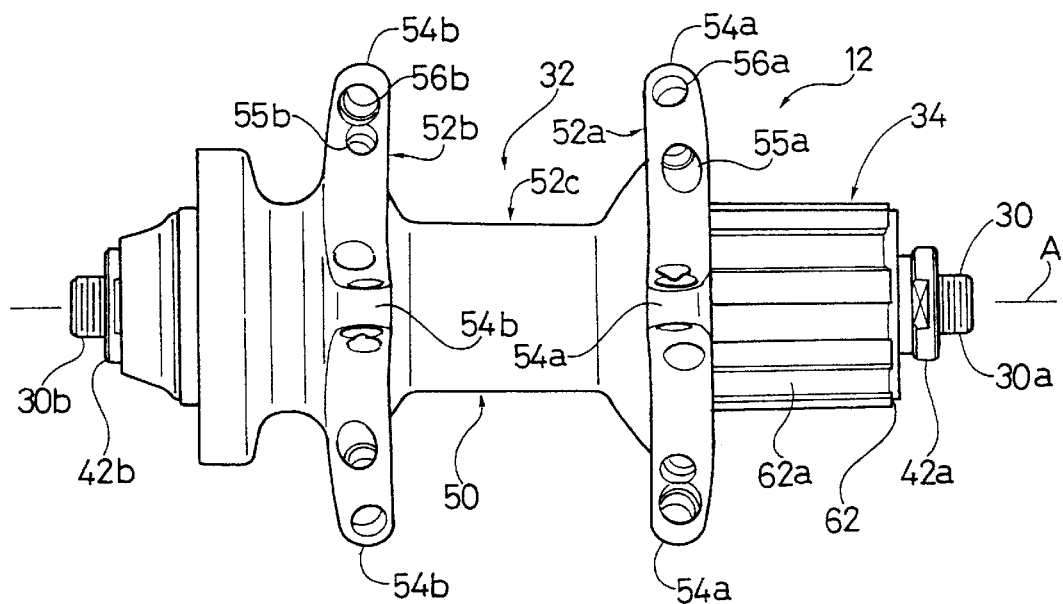
FIG. 7 is a rear elevational view of the bicycle hub unit in accordance with the present invention.
Figure 8:
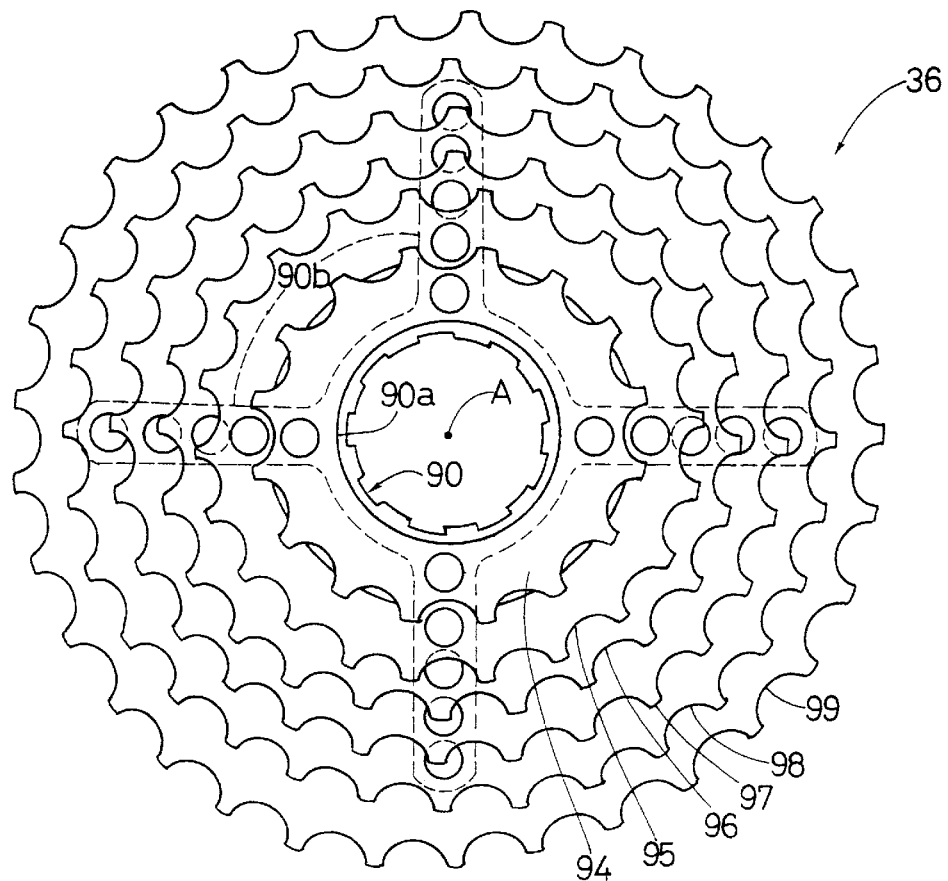
FIG. 8 is a side elevational view of the sprocket assembly for the bicycle hub assembly in accordance with the present invention.

As seen in FIGS. 5 and 6, the hub axle 30 is also preferably hollow with a quick release mechanism 40 extending therethrough for coupling the rear wheel 16 to the frame 14 in a conventional manner. The quick release mechanism 40 has a quick-release hub rod 41 extending through the axial center of the hub axle 30 with an adjusting nut 41a coupled to one end and a quick-release lever 41b coupled to other end.

Figure 9:
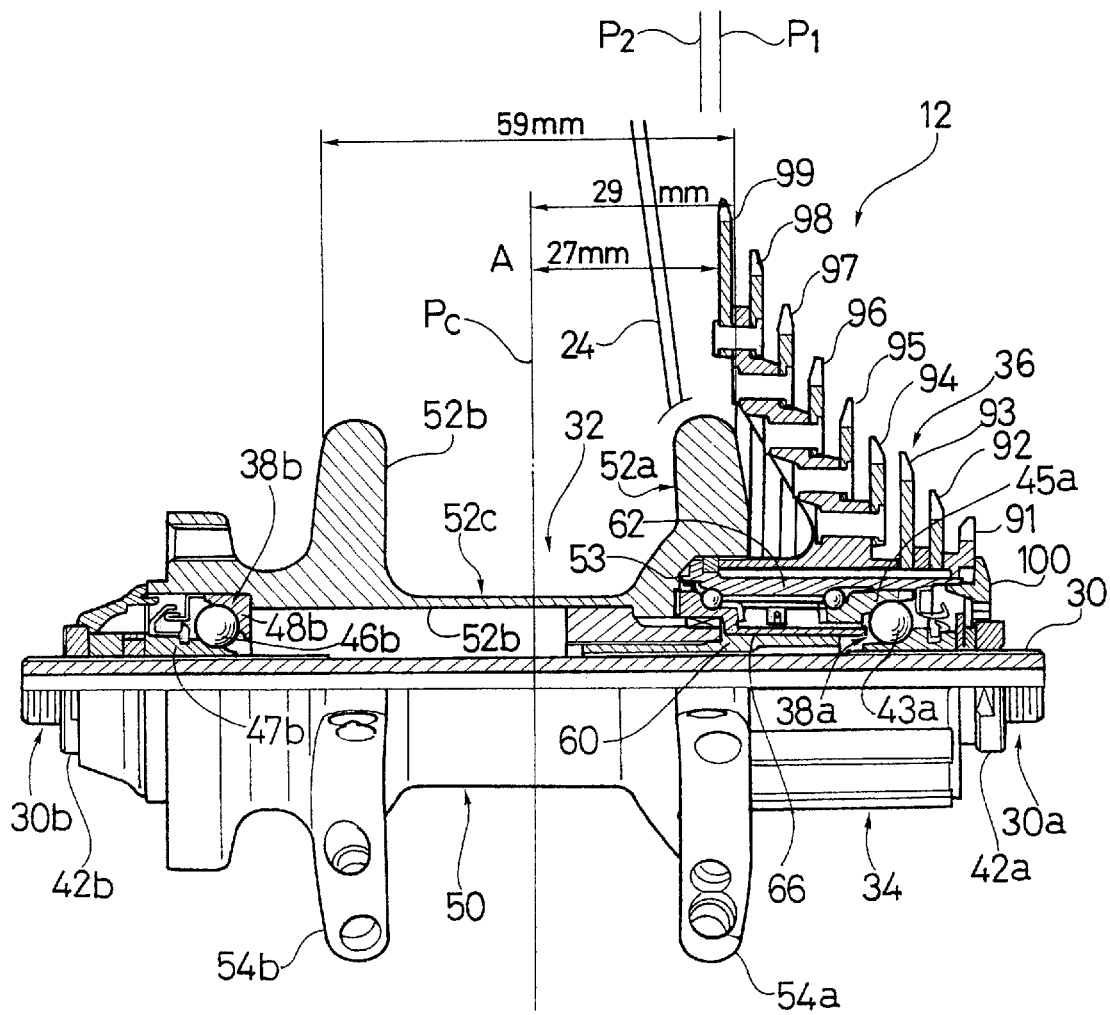
FIG. 9 is a rear elevational view of the bicycle hub assembly in accordance with the present invention, with the upper portion illustrated in cross section.
Figure 10:
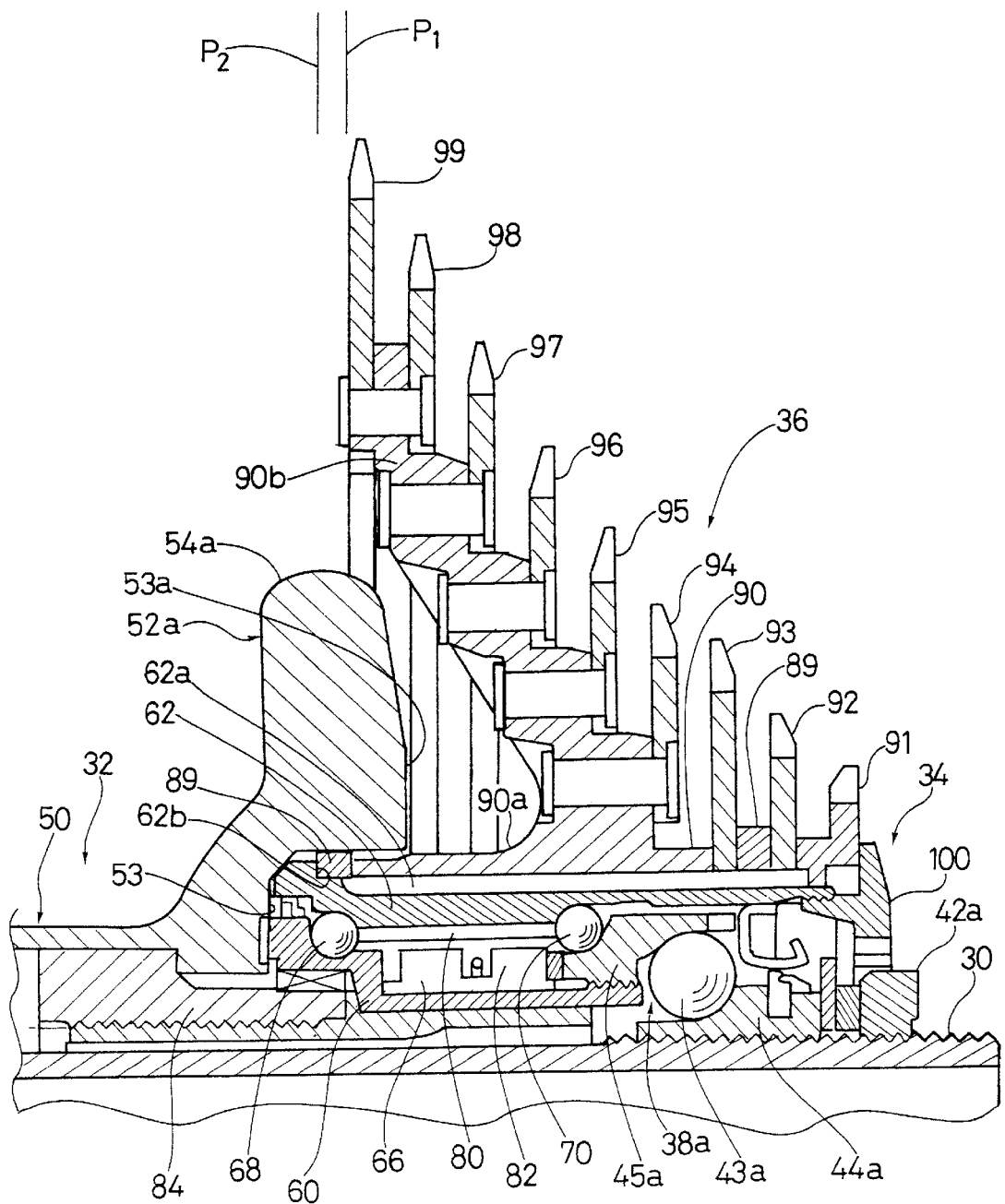
FIG. 10 a partial, enlarged cross sectional view of the bicycle hub assembly in accordance with the present invention.

As seen in FIG. 9, the first and second frame mounting ends 30a and 30b of hub axle 30 are threaded to receive a pair of nuts 42a and 42b. Nuts 42a and 42b hold bearing assemblies 38a and 38b, the hub body 50 and the hub axle 30 together when the hub unit 32 is assembled. As mentioned above, the first and second bearing assemblies 38a and 38b rotatably support the hub body 50 on hub axle 30. As seen in FIGS. 9 and 10, the bearing assembly 38a basically includes a plurality of balls 43a located between an inner race member 44a and an outer race member 45a. Similarly, the bearing assembly 38b basically includes a plurality of balls 46b located between an inner race member 47b and an outer race member 48b. Since bearing assemblies 38a and 38b and are well know in the bicycle art, they will not be discussed or illustrated in detail herein.

The hub unit 32 basically includes a hub body 50 with a first spoke mounting portion 52a located adjacent a first end of the hub body 50, a second spoke mounting portion 52b located adjacent a second end of the hub body 50 and a center tubular portion 52c extending between the first and second ends of the hub body 50. An interior passageway 52d extends through the hub body 50 between the first and second ends of the hub body 50. The bearing assemblies 38a and 38b rotatably support the hub axle 30 within the interior passageway 52d. The remaining parts of hub unit 32 are relatively conventional, and thus, the remaining parts of hub unit 32 will not be discussed or illustrated in detail herein.

Preferably, the hub body 50 is formed as a one-piece, unitary member. It will be apparent to those skilled in the art that the hub body 50 can be constructed of any substantially rigid material, such as those materials, which are known in the art. For example, the hub body 50 can be constructed of any suitable metallic material, such as plated steel, stainless steel, aluminum, magnesium or titanium, as well as other nonmetallic materials, such as carbon fiber composite, ceramic or plastic. Moreover, the first mounting portion 52a and the second mounting portion 52b could be constructed of different materials from the center tubular portion 52c of the hub body 50 as need and/or desired.

The first spoke mounting portion 52a extends radially outwardly from the first end of the hub body 50, while second spoke mounting portion 52b extends radially outwardly from the second end of the hub body 50. The second mounting portion 52b is different from the first mounting portion 52a in that the freewheel 34 is coupled to the first mounting portion 52a. Each spoke mounting portion 52a and 52b has a plurality of spoke openings for coupling a plurality of spokes 24 thereto.

Preferably, the first spoke mounting portion 52a has eight spoke openings with four inner spoke openings 55a and four outer spoke openings 56a. Spoke openings 55a and 56a will be referred to herein as the first spoke openings. The first spoke mounting portion 52a includes four attachment members 54a extending radially outwardly from the hub body 50 with two of the first spoke openings 55a and 56a formed in each of the attachment members 54a. Similarly, the second spoke mounting portion 52b has eight spoke openings with four inner spoke openings 55b and four outer spoke openings 56b. Spoke openings 55b and 56b will be referred to herein as the second spoke openings. The second spoke mounting portion 52b includes four attachment members 54b extending radially outwardly from the hub body 50 with two of the second spoke openings 55b and 56b formed in each of the attachment members 54b.

As shown in FIGS. 2, 4 and 6, the spoke attachment members 54a and 54b protrude in the diametric direction and are provided at four places each on the left and right ends at a distance from each other in the circumferential direction. The spoke attachment members 54a and 54b are provided at regular intervals in the circumferential direction, preferably ninety degrees apart from each other. The spoke attachment members 54a on the right side and the spoke attachment members 54b on the left side are aligned when view along the center axis A of the hub axle 30.

The number and shape of the spoke attachment members 54a and 54b will depend upon the number of spokes and their shapes. Accordingly, it will be apparent to those skilled in the art from this disclosure that other types and shapes of hubs can be utilized in connection with the present invention.

The first and second inner spoke openings 55a and 55b have their longitudinal axes B extending tangentially from an inner imaginary circle centered on the center axis A. The first and second outer spoke openings 56a and 56b have their longitudinal axes C extending tangentially from an outer imaginary circle centered on the center axis A. In the illustrated embodiment, the spoke openings 55a, 55b and 56a, 56b have longitudinal axes B and C, respectively, extending at an angle to the center plane $P_c$ that substantially bisects the rear wheel 16. In other words, the spokes 24 arranged in the spoke openings 55a, 55b and 56a, 56b such that the spokes 24 extend from the spoke attachment members 54a and 54b and converge towards the center plane $P_c$ as they approach the rim 26.

As seen in FIG. 4, each of the first and second spoke openings 55a, 56a and 55b, 56b forms a through hole that receives one of the spoke nipples 24a or 24b of spokes 24 therein. Each of the first and second spoke openings 55a, 56a and 55b, 56b has a larger diameter portion 58 and a smaller diameter portion 59. The spokes 24 exit out of the smaller diameter portions 59 of the first and second spoke openings 55a, 56a and 55b, 56b. The "center" of each of the first and second spoke openings 55a, 56a and 55b, 56b as used herein refers to the center opening of the smaller diameter portion 59 where the spoke 24 exits out of the spoke opening.

The inner spoke openings 55a and 55b and the outer spoke openings 56a and 56b go through the front and rear walls of the left and right spoke attachment members 54a and 54b in the circumferential direction of the hub body 50 at different positions in the radial direction from the center of the hub axle 30, that is, at different positions in the radial direction in the plane that includes the hub axle 30. The spoke openings 55a, 56a and 55b, 56b are holes that serve to engage the nipples 24a and 24b of the spokes 24.

Referring to FIGS. 9 and 10, the freewheel 34 is operatively coupled between the first end of the hub axle 30 and the first end of the hub body 50. The freewheel 34 is relatively conventional, and thus, will not be discussed or illustrated in detail herein. The main difference between the freewheel 34 of the present invention and other freewheels is that freewheel 34 is partially recessed into the first spoke mounting portion 52a. In particular, the first spoke mounting portion 52a has a recess 53 that is concentric with the interior passageway 52d for receiving an inner portion of the freewheel 34 and an inner portion of the sprocket assembly 36 therein as discussed below. In other words, the first spoke mounting portion 52a overlaps the inner portion of the freewheel 34 so that the axial spacing between the first and second spoke mounting portions 52a and 52b can be maximized without increase the overall width of the bicycle hub assembly 12.

Referring to FIG. 9, the freewheel 43 is coupled to hub body 50 in a conventional manner and has a plurality of splines for receiving the sprocket assembly 36 thereon. The freewheel 34 includes of a driven cylinder 60, a driving cylinder 62 having an outer peripheral surface (sprocket assembly receiving surface) with splines 62a for nonrotatably coupling the sprocket assembly 36 thereto, a unidirectional rotation transmission mechanism (one-way clutch) 66 and two sets of ball bearings 68 and 70 that rotatably support the driving cylinder 62 to the driven cylinder 60. The driving cylinder 62 is adapted, by means of the unidirectional rotation transmission mechanism 66 and the ball bearings 68 and 70 to freely rotate in one direction relative to the driven cylinder 60. The ball bearings 70 that supports one end side of the driving cylinder 62 are supported by the outer race 45a of bearing assembly 38a screwed onto the right-hand end of the driven cylinder 60. One end side of the driving cylinder 62 of the freewheel 34 is rotatably supported on the hub shaft 30 through balls 43a and an inner race member 44a screwed onto the hub shaft 30. The unidirectional rotation transmission mechanism 66 is so constructed that the driving cylinder 62 is provided with serrated teeth 80 on the inner periphery thereof between the ball bearings 68 and 70. The driven cylinder 60 is provided on the outer periphery thereof with transmission pawls 82 as seen in FIG. 10. The transmission pawls 82 comes into mesh with the serrated teeth 80 upon the positive rotation of the driving cylinder 62 to transmit the driving power thereof to the hub body 50 that is splined engaged with the driven cylinder 60 via the tubular support 84 of the hub body 50.

As best seen in FIG. 10, the driving cylinder 62 of the freewheel 34 has a sprocket assembly abutment surface 62b located at its inner axial end. The abutment surface 62b faces axially towards the first frame mounting end 30a of the hub axle 30 as seen in FIG. 10. The abutment surface 62b limits inward movement of the sprocket assembly 36 along splines 62a of the driving cylinder 62. This abutment surface 62b is an annular surface that is located in a plane extending substantially perpendicular to the center axis A. The plane of the abutment surface 62b is located within the recess 53 of the first spoke mounting portion 52a of the hub body 50. In other words, the plane of the abutment surface 62b is located axial inward from the most outwardly facing edge 53a of the first spoke mounting portion 52a of the hub body 50.

Referring to FIG. 10, the sprocket assembly 36 is fixedly coupled to the freewheel 34 for rotation therewith. The sprocket assembly 36 basically includes a pair of washers or spacers 89, a support member 90 with a plurality of sprockets 91–99 in the form of ring plates that are mounted on the support member 90. The support member 90 and the sprockets 91–99 are fixedly retained on the freewheel 34 by an end nut 100. The drive power transmitted to the sprocket assembly 36 is transmitted by the freewheel 34 via a chain to the hub body 50 in only one direction as discussed above.

Figure 11:
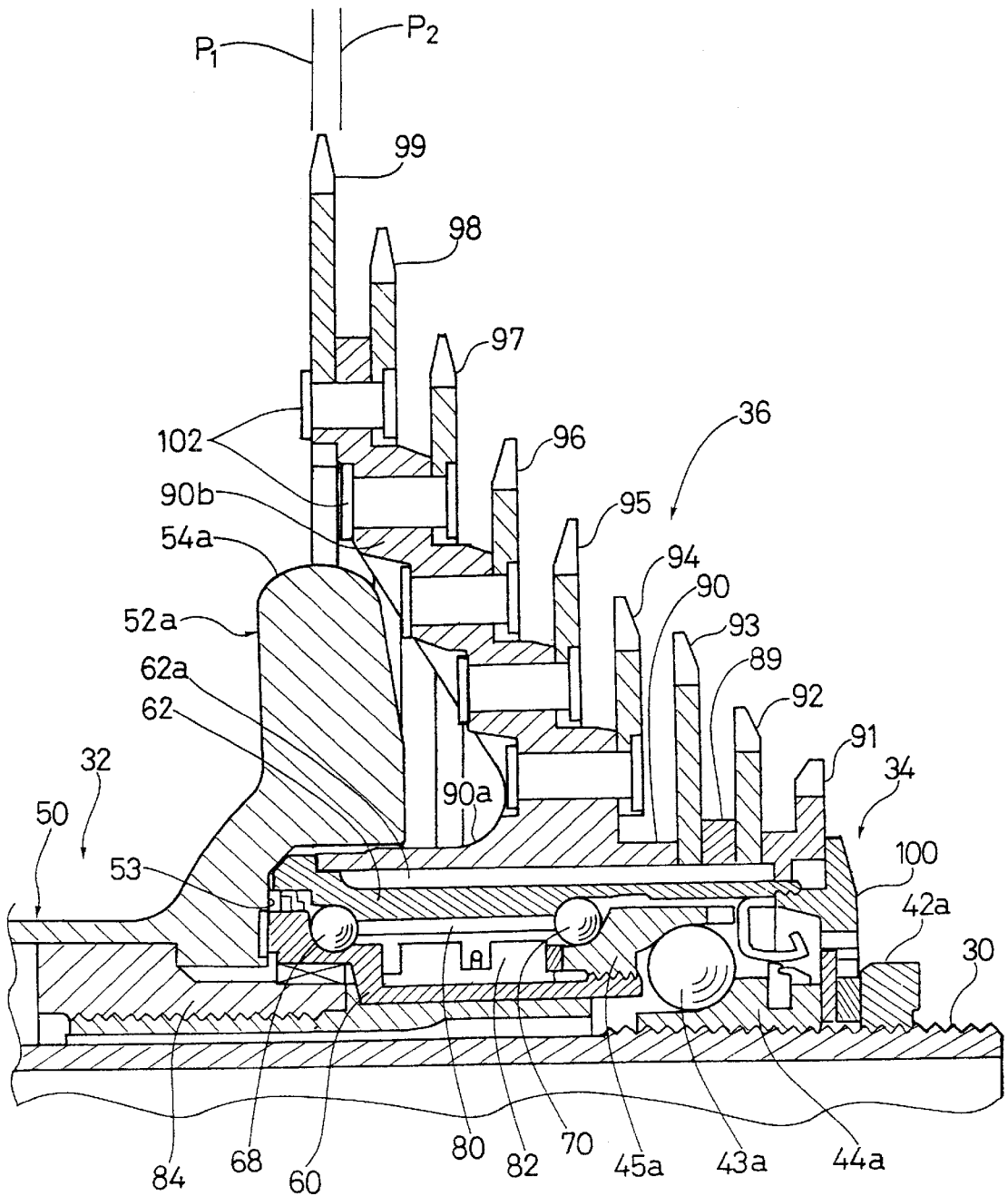
FIG. 11 a partial, enlarged cross sectional view of a modified version of a bicycle hub assembly in accordance with the present invention.

In the illustrated embodiment of FIG. 10, one of the washers 89 of the sprocket assembly 36 abut against the abutment surface 62b of the freewheel 34. Of course, the washers 89 of the sprocket assembly 36 can be remove completely, as seen in FIG. 11, or replaced with a smaller washer to move the sprocket assembly 36 axially inward.

The support member 90 axially spaces the sprockets 91–99 along the freewheel 34. In the preferred embodiment, the sprocket assembly 36 has nine sprockets. The sprocket assembly 36 is mounted on the freewheel 34 such that the first spoke mounting portion 52a of the hub body 50 is at least partially located in a radial center portion of the innermost or largest sprocket 99. Moreover, the innermost or largest sprocket 99 has an inwardly facing side surface lying in a plane $P_1$ that is substantially perpendicular to the center axis A. This plane $P_1$ of the side surface of the sprocket 99 is located axially within 3.0 mm of a "center" of one of the first spoke openings 55a or 56a. As mentioned above, the center of each of the spoke openings 55a, 56a, 55b and 56b as used herein refers to the center opening of the smaller diameter portion 59 where the spoke 24 exit out of the spoke opening 55a, 56a, 55b or 56b. The centers of the spoke openings 55a, 56a, 55b and 56b lie in a plane $P_2$ that is substantially perpendicular to the center axis A. Plane $P_1$ of the side surface of the sprocket 99 is located axially within 3.0 mm of plane $P_2$ of the centers of the spoke openings 55a, 56a, 55b and 56b. More preferably, the plane $P_1$ of the side surface of the sprocket 99 is located axially within 2.0 mm of the plane $P_2$ of the centers of the first spoke openings 55a and 56a, when the plane $P_1$ is located relative to the hub axle 32 on an axial side of the centers of the first spoke openings 55a and 56a that is closest to the first end of the hub body 50 as seen in FIG. 10. When the plane $P_1$ is located relative to the hub axle 32 on an axial side of the centers of the first spoke openings 55a and 56a that is closest to the second end of the hub body 50, the plane $P_1$ of the side surface of the sprocket 99 is located axially within 3.0 mm of the plane $P_2$ of the centers of the first spoke openings 55a and 56a as seen in FIG. 11.

The support member 90 basically includes a base portion 90a and a plurality of support arms 90b extending radially outwardly from the base portion 90a the sprockets 94–99 coupled thereto. The base portion 90a has an inner portion that is located within recess 53 of the first spoke mounting portion 52a. Also, the inner edge of the base portion 90a is preferably substantially aligned with plane $P_1$ of the side surface of the sprocket 99. The support arms 90b are inclined toward the first spoke mounting portion 52a with respect to the center axis A so that the first spoke mounting portion 52a is at least partially located in a radial center portion of the support arms 90b and the innermost sprocket 99. The support arms 90b have a plurality of steps including vertical surfaces 90d that are substantially perpendicular to the center axis A and horizontal surfaces 90e that are substantially parallel to the center axis A.

In the illustrated embodiment, sprockets 91–93 are supported directly on the driving cylinder 62, while the sprockets 94–99 are coupled by rivets or fasteners 102 to the support arms 90b of the support member 90, which is supported on the driving cylinder 62. The base portion 90a has a splined center bore 90c that mates with the splines 62a of the driving cylinder 62 so that they rotate together.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub assembly comprising:
   a hub axle having a center axis extending between a first frame mounting end and a second frame mounting end;
   a hub unit having a hub body, a first spoke mounting portion located adjacent a first end of said hub body, a second spoke mounting portion located adjacent a second end of said hub body and an interior passageway extending through said hub body with said hub axle being rotatably supported therein;
   a freewheel operatively coupled to said first end of said hub body, said freewheel including a driving member, a driven member and a unidirectional transmission mechanism, said driven member is non-rotatably coupled to said hub body, said unidirectional transmission mechanism being operatively coupled between said driving member and said driven member; and
   a sprocket assembly including a base portion with a plurality of sprockets axially spaced apart along said base portion, said base portion being replaceably coupled to said driving member of said freewheel, said base portion of said sprocket assembly having an inner portion recessed within a recess of said first spoke mounting portion.

2. A bicycle hub assembly according to claim 1, wherein said sprocket assembly includes a plurality of support arms extending radially outwardly from said base portion with some of said sprockets coupled thereto, said support arms being inclined toward said first spoke mounting portion with respect to said center axis so that said first spoke mounting portion is at least partially located in a radial center portion of said support arms.

3. A bicycle hub assembly according to claim 2, wherein said support arms has a plurality of steps including vertical surfaces substantially perpendicular to said center axis and horizontal surfaces substantially parallel to said center axis.

4. A bicycle hub assembly according to claim 3, wherein said first spoke mounting portion extends radially outwardly from said hub body.

5. A bicycle hub assembly according to claim 1, wherein said first spoke mounting portion extends radially outwardly from said hub body.

6. A bicycle hub assembly according to claim 1, wherein said first spoke mounting portion includes four attachment members extending radially outwardly from said hub body with two first spoke openings formed in each of said attachment members of said first spoke mounting portion, and said second spoke mounting portion includes four attachment members extending radially outwardly from said hub body with two second spoke openings formed in each of said attachment members of said second spoke mounting portion.

7. A bicycle hub assembly according to claim 1, wherein said first spoke mounting portion includes a plurality of first spoke openings with longitudinal axes that are tangentially arranged about an imaginary circle centered on said center axis, and said second spoke mounting portion includes a plurality of second spoke openings with longitudinal axes that are tangentially arranged about an imaginary circle centered on said center axis.

8. A bicycle hub assembly according to claim 1, wherein a portion of said driving member of said freewheel is axially positioned in said recess of said first spoke mounting portion that is concentric with said interior passageway.

9. A bicycle hub assembly according to claim 1, wherein said first spoke mounting portion includes a plurality of first spoke openings with a through hole with a larger diameter portion and a smaller diameter portion, and said second spoke mounting portion includes a plurality of second spoke openings with a through hole with a larger diameter portion and a smaller diameter portion.

10. A bicycle hub assembly according to claim 9, wherein said first and second spoke openings have longitudinal axes that are tangentially arranged about an imaginary circle centered on said center axis.

11. A bicycle hub assembly comprising:

a hub axle having a center axis extending between a first frame mounting end and a second frame mounting end;

a hub body having a first end of said hub body with a most outwardly facing edge and a second end of said hub body, said hub axle rotatably supporting said hub body;

a freewheel disposed on said first frame mounting end of said hub axle and operatively coupled to said first end of said hub body, said freewheel including a driving member, a driven member and a unidirectional transmission mechanism, said driven member is non-rotatably coupled to said hub body, said unidirectional transmission mechanism being operatively coupled between said driving member and said driven member, said driving member of said freewheel having a sprocket assembly receiving surface, said driving member having a sprocket assembly abutment surface that faces axially towards said first frame mounting end of said hub axle, said sprocket assembly abutment surface being located axially inward of said most outwardly facing edge of said hub body.

12. A bicycle hub assembly according to claim 11, further comprising a sprocket assembly including a plurality of sprockets axially spaced apart along said freewheel with a portion of said first end of said hub body being at least partially located in a radial center portion of one of said sprockets.

13. A bicycle hub assembly according to claim 11, wherein a sprocket assembly including a base portion and a plurality of support arms extending radially outwardly from said base portion with a plurality of sprockets coupled thereto, said support arms being inclined toward said first end of said hub body with respect to said center axis so that said first end of said hub body is at least partially located in a radial center portion of said support arms.

14. A bicycle hub assembly according to claim 13, wherein said support arms has a plurality of steps including vertical surfaces substantially perpendicular to said center axis and horizontal surfaces substantially parallel to said center axis.

15. A bicycle hub assembly according to claim 14, wherein said first end of said hub body has a first spoke mounting portion extending radially outwardly from said hub body.

16. A bicycle hub assembly according to claim 11, wherein said first end of said hub body has a first spoke mounting portion extending radially outwardly from said hub body.

17. A bicycle hub assembly according to claim 11, wherein said first end of said hub body has a first spoke mounting portion with four attachment members extending radially outwardly from said hub body with two first spoke openings formed in each of said attachment members of said first spoke mounting portion.

18. A bicycle hub assembly according to claim 11, wherein said first end of said hub body has a first spoke mounting portion with a plurality of first spoke openings with longitudinal axes that are tangentially arranged about an imaginary circle centered on said center axis.

19. A bicycle hub assembly according to claim 18, wherein said first spoke openings with a through hole with a larger diameter portion and a smaller diameter portion.

20. A bicycle hub assembly according to claim 18, wherein said first end of said hub body has a first spoke mounting portion includes a plurality of first spoke openings with longitudinal axes that are tangentially arranged about an imaginary circle centered on said center axis, and said second end of said hub body has a second spoke mounting portion includes a plurality of second spoke openings with longitudinal axes that are tangentially arranged about an imaginary circle centered on said center axis.

21. A bicycle hub assembly comprising:

a hub axle having a center axis extending between a first frame mounting end and a second frame mounting end;

a hub unit having a hub body with said hub axle being rotatably supported therein, a first spoke mounting portion with a plurality of first spoke openings located adjacent a first end of said hub body, and a second spoke mounting portion located adjacent a second end of said hub body;

a freewheel disposed on said first frame mounting end of said hub axle and operatively coupled to said first end of said hub body, said freewheel including a driving member, a driven member and a unidirectional transmission mechanism, said driven member is non-rotatably coupled to said hub body, said unidirectional transmission mechanism being operatively coupled between said driving member and said driven member; and a sprocket assembly including a base portion with a plurality of sprockets axially spaced apart along said base portion, said base portion being replaceably coupled to said driving member of said freewheel, said sprockets having a largest sprocket with an inwardly facing side surface lying in a plane substantially perpendicular to said center axis, said plane of said side surface of said largest sprocket being located axially within 3.0 mm of a center of one of said first spoke openings, said base portion of said sprocket assembly having an inner portion recessed within a recess of said first spoke mounting portion.

22. A bicycle hub assembly according to claim 21, wherein said plane of said side surface of said largest sprocket is located relative to said hub axle on an axial side of said center of said one of said first spoke openings that is closest to said second end of said hub body.

23. A bicycle hub assembly according to claim 21, wherein said plane of said side surface of said largest sprocket is located relative to said hub axle on an axial side of said center of said one of said first spoke openings that is closest to said first end of said hub body.

24. A bicycle hub assembly according to claim 21, wherein said plane of said side surface of said largest sprocket is located axially within 2.0 mm of said center of said one of said first spoke openings.

25. A bicycle hub assembly according to claim 21, wherein said sprocket assembly includes a plurality of support arms extending radially outwardly from said base portion with some of said sprockets coupled thereto, said support arms being inclined toward said first spoke mounting portion with respect to said center axis so that said first spoke mounting portion is at least partially located in a radial center portion of said support arms.

26. A bicycle hub assembly according to claim 25, wherein said support arms has a plurality of steps including vertical surfaces substantially perpendicular to said center axis and horizontal surfaces substantially parallel to said center axis.

27. A bicycle hub assembly according to claim 21, wherein said first spoke mounting portion extends radially outwardly from said hub body.

28. A bicycle hub assembly according to claim 21, wherein said first spoke mounting portion includes four attachment members extending radially outwardly from said hub body with two of said first spoke openings formed in each of said attachment members of said first spoke mounting portion.

29. A bicycle hub assembly according to claim 21, wherein said first spoke openings with longitudinal axes that are tangentially arranged about an imaginary circle centered on said center axis.

30. A bicycle hub assembly according to claim 21, wherein a portion of said driving member of said freewheel is axially positioned in said recess of said first spoke mounting portion that is concentric with said interior passageway.

31. A bicycle hub assembly according to claim 21, wherein said first spoke mounting portion includes a plurality of first spoke openings with a through hole with a larger diameter portion and a smaller diameter portion.

* * * * *